INVENTOR.
Herbert J. Wollner
BY
Roberts, Cushman & Grover
ATT'YS

United States Patent Office 3,117,402
Patented Jan. 14, 1964

3,117,402
METHOD FOR GRINDING A HOLLOW DRILL
Herbert J. Wollner, Belmont, Mass., assignor to ACH Fiber Service, Inc., Boston, Mass., a corporation of Massachusetts
Filed Mar. 1, 1961, Ser. No. 92,487
1 Claim. (Cl. 51—288)

This invention relates to a method for grinding a tool having a spiral cutting edge such as described and claimed in my co-pending application Ser. No. 92,486 filed on even date herewith.

Objects of the invention are to provide a machine which will grind a spiral cutting edge accurately and rapidly, which can be manipulated easily without skill or experience, which is simple and economical in construction and which is durable and reliable in use.

Another object of this invention is to provide a method for grinding a spiral cutting edge accurately and radially.

According to this invention the apparatus comprises a stationary support, a tool holder mounted on the support to rotate about an axis, means for mounting a tool on the holder with its axis in alignment with the aforesaid axis and with its cutting end projecting from the holder, and means for concomitantly producing rotation and advancement of the holder in the support. Preferably the apparatus has means to limit the aforesaid rotation to approximately 360°. In the preferred embodiment the holder is threaded in the support to produce the aforesaid concomitant rotation and advancement. The apparatus should also have a base for the support, means for pivotally mounting the support on the base to swing in a plane containing said axes and means for advancing and retracting the support to accommodate tools of different length.

Figure 1:
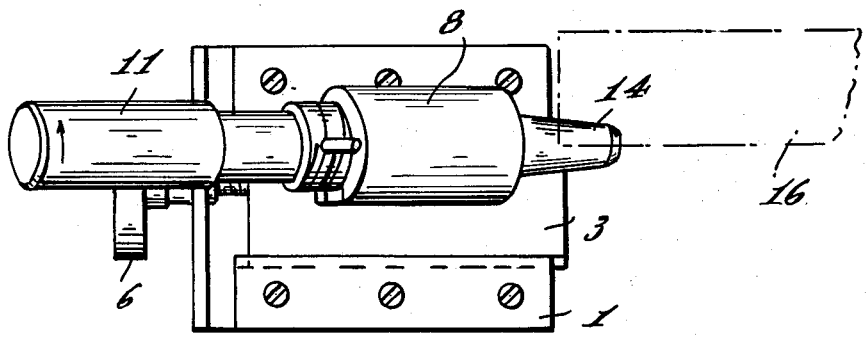
Figure 2:
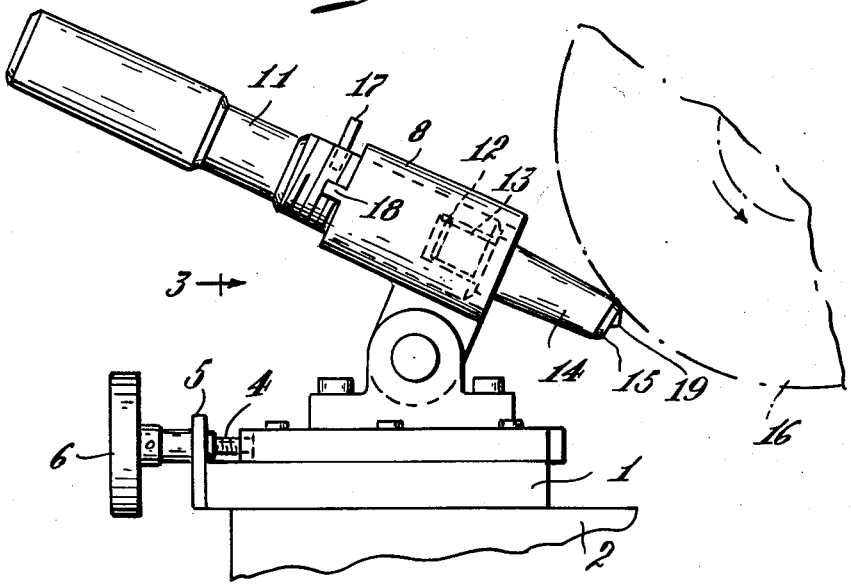
Figure 3:
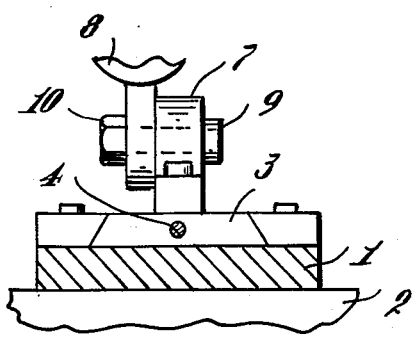

For the purpose of illustration a typical embodiment is shown in the accompanying drawing in which
FIG. 1 is a plan view;
FIG. 2 is a side view; and
FIG. 3 is a section on line 3—3 of FIG. 2.

The particular embodiment of the invention chosen for the purpose of illustration comprises a base 1 adapted to be supported on a table 2 or the like. The base comprises a dovetail slide 3 which is adjustable by means of a screw 4 journalled in the front 5 of the base and operated by a knob 6. The dovetail slide 3 has an upstanding lug 7 on which a stationary support 8 is pivotally mounted by means of a bolt 9 to tilt the holder back and forth, the holder being held in adjusted position by means of a nut 10 threaded on the end of the bolt. Threaded into the rear end of the tubular support 8 is a holder 11 having on its forward end a threaded socket 12 to receive the threaded rearward end 13 of the tool 14 which has a spiral cutting edge 15 as described and claimed in the aforesaid co-pending application. The apparatus may be used with any ordinary grinding wheel such as indicated by broken lines at 16.

To advance the holder 11 in the support 8 the holder is turned in the direction of the arrow in FIG. 1, thereby advancing the spiral cutting edge against the grinding wheel 16 as the holder is rotated. Before starting to grind the holder should be turned to bring the tip of the tool in to contact with the grinding wheel. Then by giving the holder a full turn in the direction of the arrow the spiral cutting edge is ground through 360°. To limit the rotation of the holder to 360° a pin 17 on the holder engages a stop 18 on the support. As shown in FIG. 1 the holder has progressed through approximately 90°. The axis of the tool should be in alignment with the side of the wheel 16 as shown in FIG. 1.

It should be understood that the present disclosure is for the purpose of illustration only and that this invention includes all modifications and equivalents which fall within the scope of the appended claim.

I claim:
In grinding a hollow drill having an annular wall which has a continuous exterior periphery, the method which comprises rotating the drill about its axis while continuously advancing the drill obliquely against a grindstone with the end of the drill bearing on the grindstone throughout the thickness of said wall, the drill being directed against an edge of the grindstone, and stopping said rotating and advancing substantially simultaneously, thereby to produce a continuous spiral edge with a shoulder between the high and low ends of the spiral.

References Cited in the file of this patent
UNITED STATES PATENTS

| | | |
|---|---|---|
| 1,674,223 | Rabut | June 19, 1928 |
| 2,119,741 | Fischer | June 7, 1938 |
| 2,217,545 | Guenther | Oct. 8, 1940 |
| 2,758,430 | Sprenzel | Aug. 14, 1956 |
| 2,772,525 | Fowler | Dec. 4, 1956 |